Jan. 28, 1930.     B. B. BOYD     1,745,290

JOINT FOR CONCRETE PIPE

Filed Jan. 25, 1927

INVENTOR.
BUTLER B. BOYD
BY A. B. Bowman
ATTORNEY

Patented Jan. 28, 1930

1,745,290

UNITED STATES PATENT OFFICE

BUTLER B. BOYD, OF SAN DIEGO, CALIFORNIA

JOINT FOR CONCRETE PIPE

Application filed January 25, 1927. Serial No. 163,531.

My invention relates to joints for concrete or plastic pipe, and the objects of my invention are: first, to provide a concrete pipe joint and method of producing the same which will be watertight under both low and high pressure; second, to provide a concrete pipe joint and method of this class which will remain tight but will permit the expansion and contraction of the pipe caused by changes of temperature; third, to provide a novel composition for pipe joints of this class; fourth, to provide a novel method of making concrete pipe joints; fifth, to provide a device and compound which will not readily wear with the friction caused by the movement of the pipe sections; sixth, to provide a compound and method of this class which is applicable to various pipe joints, and seventh, to provide a device, compound and method of this class which is easily and economically made, durable, efficient, and which will not readily deteriorate or get out of order.

Figure 1:
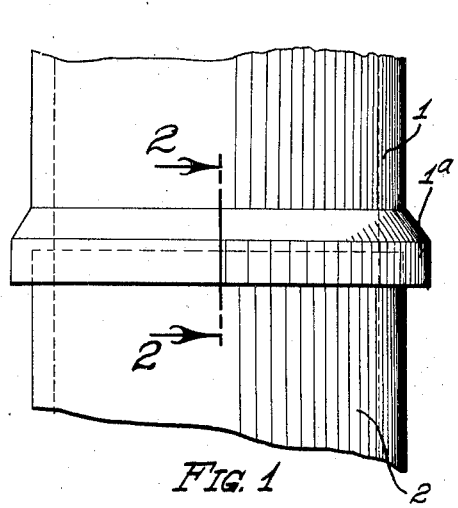
Figure 2:
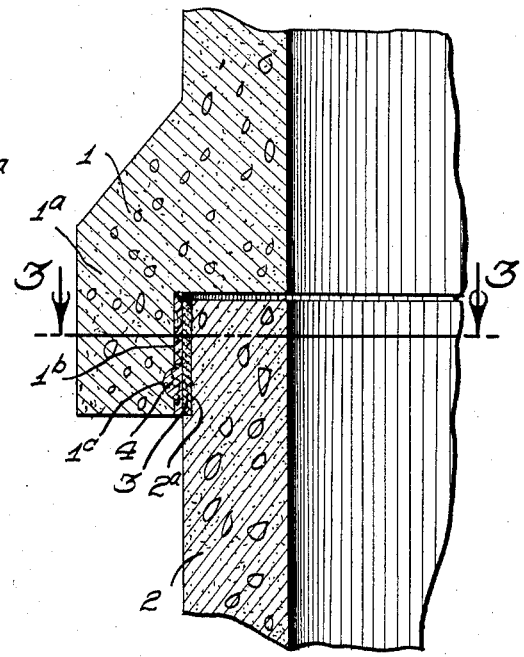
Figure 3:
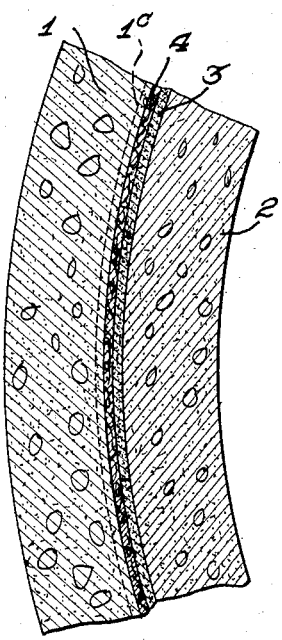
Figure 4:
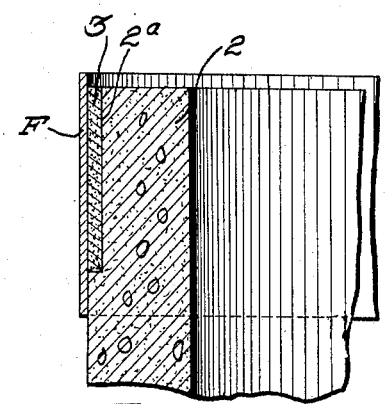

With these and other objects in view, as will appear hereinafter, my invention consists of certain novel features of construction, combination and arrangement of parts and portions and the certain compound and method of producing concrete pipe joints, as will be hereinafter described in detail and particularly set forth in the appended claims, reference being had to the accompanying drawings and to the characters of reference thereon, which form a part of this application, in which:

Figure 1 is an elevational view of a joint at the junction of two sections of concrete pipe; Fig. 2 is an enlarged longitudinal sectional view thereof through 2—2 of Fig. 1; Fig. 3 is an enlarged cross-sectional view thereof through 3—3 of Fig. 2, and Fig. 4 is an enlarged longitudinal sectional view of a portion of pipe before the form is removed.

Similar characters of reference refer to similar parts and portions throughout the several views of the drawings.

The pipe sections 1 and 2, joint surface compound 3, and calking 4, constitute the principal parts and portions of my pipe joint.

The pipe sections shown in the drawings are the concrete bell and spigot pipe, similar in form to the conventional type used. The pipe 1, of which only a fragment is shown, is belled out at $1^a$, providing a recess $1^b$, in which the end of the pipe 2 rests. The pipe 1 has on the inner recessed portion, an annular groove $1^c$. The pipe 2, of which only a fragment is shown, has a flat annular reduced portion $2^a$ at its extremity, which preferably extends the length of the overlapped portion of said pipe. A compound is placed in this groove forming a smooth surfaced annular ring at the outer end of the pipe by a method which will be hereinafter described. The spigot end of the pipe 2 with the compound is placed in the recess portion of the pipe 1. The space between the two pipes is stuffed with calking. The groove $1^c$ serves to keep the calking from working out of the joint. The compound 3 is composed of approximately equal parts of sulfur and sand. A form having an inner diameter equal to the outer diameter of the pipe is placed around the annular cutout portion $2^a$. This form is preferably composed of some heat-resisting smooth surface material.

The compound of the sulfur and sand is heated to a molten state and poured in the space provided by the recess portion $2^a$. When the compound has cooled sufficiently and hardened, the form is removed. The compound adheres to the spigot end of the pipe, and having a smooth outer surface, allows the pipe 1 to move in relation to the pipe 2 with no danger of the joint becoming loose because of frictional wear.

Though I have shown and described a particular construction, method and compound, I do not wish to be limited to the certain construction, method and compound, but wish to include in the scope of my invention, the certain combinations of parts and portions, method and compound as set forth in the appended claims.

Having thus described my invention, what I claim as new and desire to secure by Letters Patent is:

1. A concrete pipe joint, including a concrete pipe section provided with a bell portion, another concrete pipe section provided with a spigot portion positioned in said bell portion and provided with a hard smooth outer surfaced lining, and a calking packed between said lining and bell portion.

2. A concrete pipe joint, including a concrete pipe section provided with a bell portion, another concrete pipe section provided with a spigot portion positioned in said bell portion and provided with a hard smooth outer surfaced lining, consisting of a compound of sulphur and sand and a calking packed between said lining and bell portion.

3. A concrete pipe joint, including a concrete pipe section provided with a bell portion, another concrete pipe section provided with a spigot portion positioned in said bell portion and provided with a hard smooth outer surfaced lining, consisting of a compound sulphur and sand in equal parts molded thereon while in a molten state and a calking packed between said lining and bell portion.

4. A concrete pipe joint, including a concrete pipe composed of sections, a bell-shaped portion at one end of each of said sections, a spigot-shaped portion at the opposite end of each of said sections, said spigot end adapted to fit within said bell-shaped end of a similar section of pipe, and an expansion joint between said spigot end and bell-shaped end, said joint consisting of a hard, smooth surfaced compound adhered to said spigot end of said pipe, an annular groove in the inner periphery of said bell-shaped pipe end, and calking in the space between said spigot-shaped and bell-shaped pipe ends.

5. A concrete pipe joint, including a concrete pipe composed of sections, a bell-shaped portion at one end of each of said sections, a spigot-shaped portion at the opposite end of each of said sections, said spigot end adapted to fit within said bell-shaped end of a similar section of said pipe, and an expansion joint between said spigot end and the bell-shaped end of said section of pipe, said joint consisting of a hard, smooth surfaced compound composed of sulphur and sand in approximately equal portions molded onto said spigot portion, and calking between said hard, smooth surfaced compound and said bell-shaped portion.

6. A concrete pipe section having a bell portion at its one end and a relatively shallow reduced portion at its other end, said reduced portion having a superposed layer of hard, smooth surfaced compound, the outer surface thereof being substantially flush with the contiguous concrete surface, said layer of compound forming the expansion joint surface of said pipe section.

7. A concrete pipe section having a bell-shaped portion at its one end, a spigot portion at its other end normally adapted to extend loosely within the bell-shaped portion of a second pipe section, forming overlapping portions, one of said overlapping portions having a layer consisting of a hard, smooth surfaced compound formed thereon and positioned between said overlapping portions, and calking between said layer and said other overlapping portion.

In testimony whereof, I have hereunto set my hand at San Diego, California, this 14th day of January, 1927.

BUTLER B. BOYD.